Nov. 15, 1966  D. J. SELLMEYER  3,285,093
COVER SEAL FOR SHIFT CONSOLE
Filed June 15, 1964  2 Sheets-Sheet 1
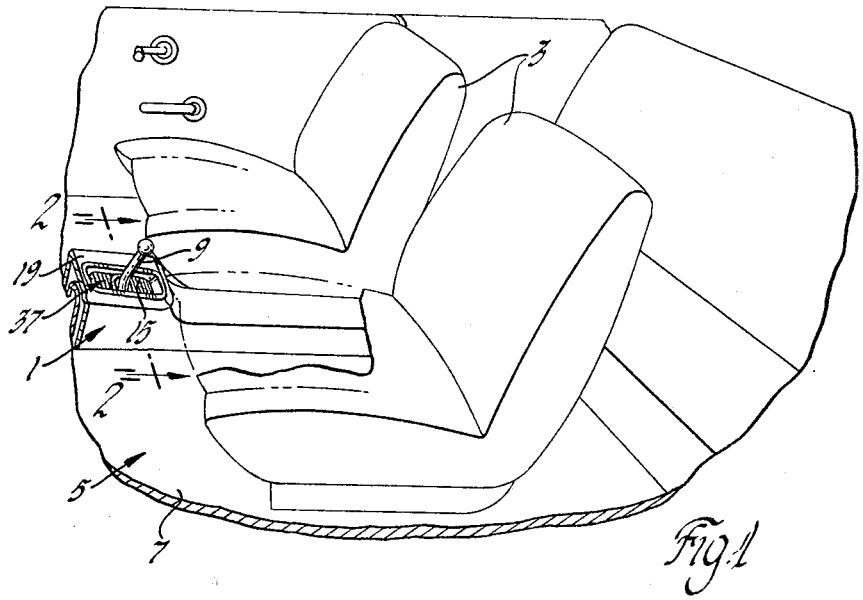
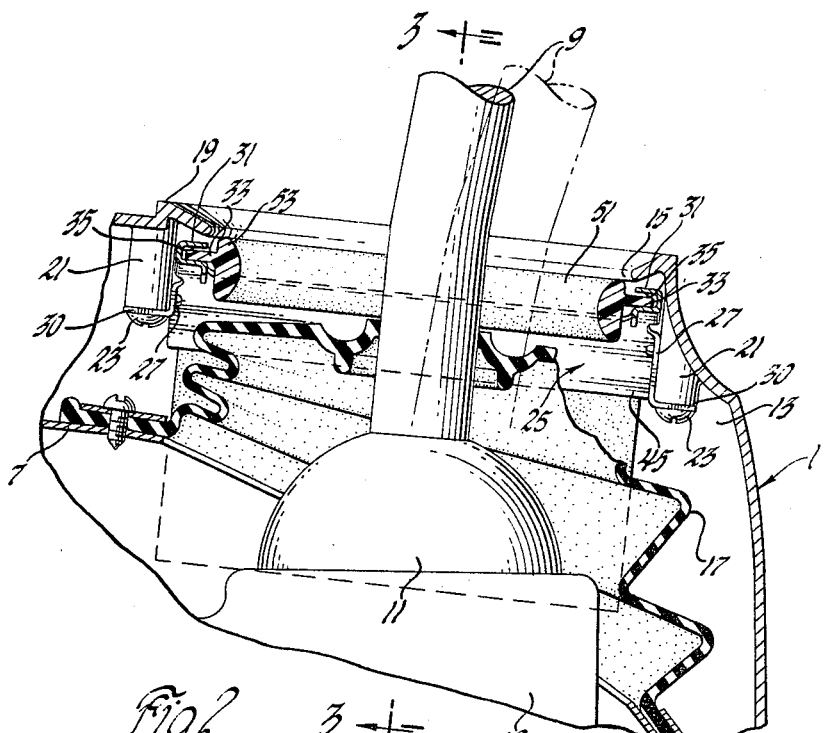
INVENTOR.
Daniel J. Sellmeyer
BY
A. M. Heiter
ATTORNEY Nov. 15, 1966 D. J. SELLMEYER 3,285,093
COVER SEAL FOR SHIFT CONSOLE
Filed June 15, 1964 2 Sheets-Sheet 2

INVENTOR.
Daniel J. Sellmeyer
BY
A. M. Heiter
ATTORNEY

United States Patent Office 3,285,093
Patented Nov. 15, 1966

3,285,093
COVER SEAL FOR SHIFT CONSOLE
Daniel J. Sellmeyer, Royal Oak, Mich., assignor to General Motors Corporation, Detroit, Mich., a corporation of Delaware
Filed June 15, 1964, Ser. No. 374,987
4 Claims. (Cl. 74—566)

This invention relates generally to sealing structures for openings and more particularly to improvements in shift consoles incorporating cover seals for shift lever openings.

It has been the practice in modern vehicles to provide a console on the vehicle floor in the front passenger compartment between the seats for the vehicle operator and the passenger. The console provides a finely finished appearance for the interior of the vehicle and is adapted to cover the hump in the vehicle floor which accommodates the vehicle transmission. The console provides convenient space for storage of items and further protects the transmission lever or selector that extends from the transmission into the front passenger compartment. This selector projects through an opening cut into the upper portion or top plate of the console which must be of dimensions suitable to accommodate the various positions of the transmission selector necessary for the proper operation of the vehicle. The console opening, which must of necessity be relatively large, has heretofore provided an entrance for foreign matter which finds its way into the interior of the console. This is objectionable since such material is unsightly and difficult to remove. Furthermore, the opening detracts from the general appearance of the interior of the vehicle.

It is an object of this invention to provide improved sealing of an opening formed in a member including a cover movably mounted in an improved cover support bracket secured to the member which accommodates the cover in any adjusted position.

A further object of this invention is to provide a finishing cover for a plate opening for a movable lever extending therethrough which moves in a substantially flat path across the opening and in a curved path beyond the opening.

Another object of this invention is to provide a movable protective cover for a vehicle console opening which prevents foreign matter from entering into the console.

Another object of this invention is to provide an improved shift console which includes a movable, flexible cover seal to cover the opening in the console which accommodates the movement of the shift lever projecting therethrough and which includes improved storage for accommodating a portion of the cover seal as it is moved in response to shift lever displacement.

Other features, advantages and objects of this invention will become apparent by reference to the detailed description of this invention and to the drawings wherein:

FIGURE 1 depicts a console partially broken away, as installed in the passenger compartment of a vehhicle;

FIGURE 2 is a sectional view taken on lines 2—2 of FIGURE 1;

Figure 3:
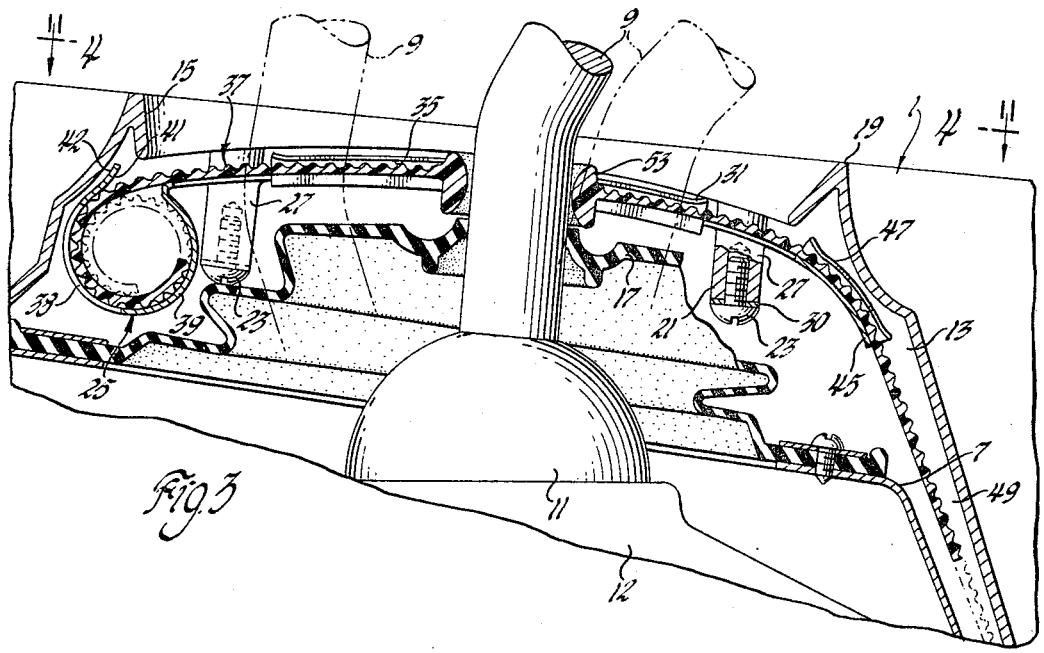
FIGURE 3 is a sectional view taken along lines 3—3 of FIGURE 2.

Referring to the drawings, FIGURE 1 shows a console 1 installed in a conventional manner between the front seats 3 of the vehicle 5. This console extends longitudinally on the vehicle floor 7, covering a transmission hump or other projection which may be formed in the vehicle floor.

A transmission shift selector or lever 9 is supported by pivot 11 on the vehicle or transmission housing 12 for longitudinal and transverse movement. The lower end of lever 9 is operatively connected by conventional linkage (not shown) to control the transmission. The lever 9 extends upwardly through the floor 7 into the interior 13 of the console 1 and through an opening 15 formed in the upper panel 19 of the console. This opening defines a relatively large rectangular area to accommodate the various positions required by the transmission shift lever when manipulated by the vehicle operator. A flexible boot 17 fastened to the floor surrounds and protects the pivot 11 in a conventional manner.

Integrally secured to the underside of the upper panel 19 of the console on each side of the opening 15 are four downwardly extending bosses 21. These bosses may be internally threaded for the reception of screws or fasteners 23 for a purpose described below. As shown best by FIGS. 2 and 3 a cover support frame 25 for flexible, laterally-ridged cover 37 is secured to the interior of the console directly beneath the upper surface of the console. This frame is preferably formed with four integral downwardly projecting tabs 27 which have on their lower ends integral offset leaf portions 30 extending outwardly therefrom. The fasteners 23 extend through suitable openings in these leaf portions to firmly secure the support frame to the bosses 21.

The cover support frame is formed with a rectangular opening therein preferably larger than the opening 15 in the upper portion of the console. This frame opening is substantially aligned with the opening 15 and is also adapted to receive the transmission shift lever and to accommodate the various adjusted positions of the lever 9. Cover guide tracks 31 are integrally formed on opposite sides 29 of the cover support frame. These tracks provide opposed inwardly facing grooves 35 which support and guide cover 37 by its outwardly extending edge portions 33 in the console directly beneath the upper panel to cover the opening 15 therein.

Figure 4:
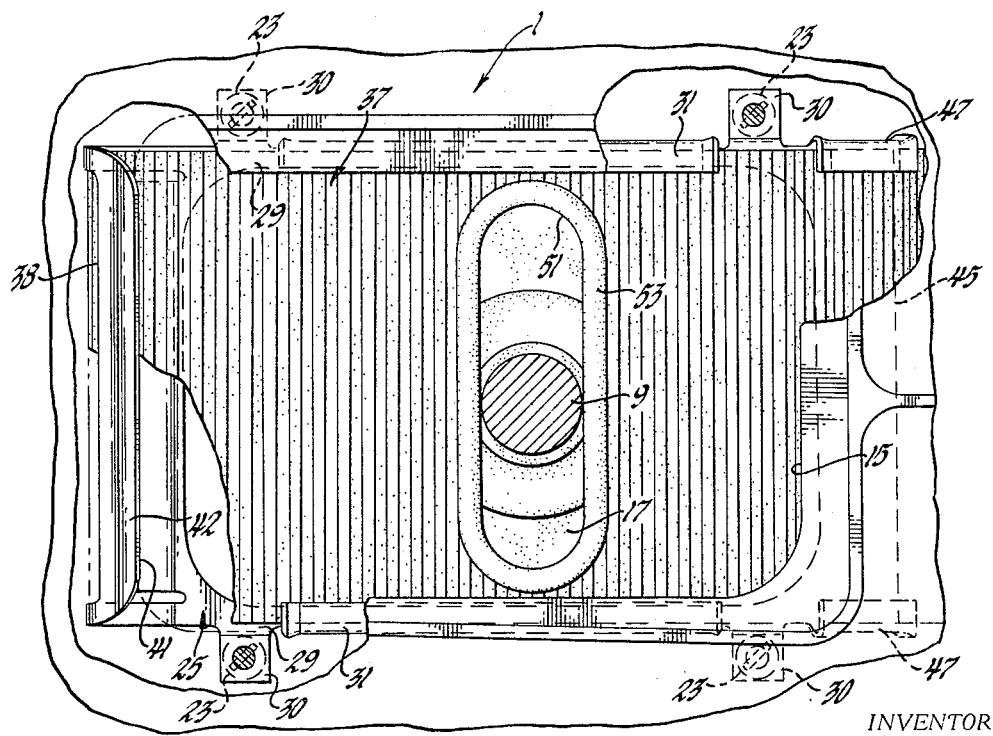
FIGURE 4 is a top view of a portion of the console taken along lines 4—4 of FIGURE 3.

As shown by FIGS. 3 and 4, one end of the cover support frame has a curved wall forming a cylindrical cover storage container 39 integrally formed therewith. This storage container has an open mouth 41 partially defined by upwardly projecting lip 42 which is adapted to receive and feed one end of cover member 37 into the container. The storage container is cut back or apertured as at 38 to reduce friction when the end of the cover member is moved in the container. The opposite end 45 of the cover support frame is provided with opposed spaced guide tracks 47 which are similar in construction to tracks 31. However, as best shown in FIGS. 3 and 4 these tracks are downwardly inclined for the purpose of guiding the rear end of the cover member 37 into a storage space 49 in the rear of the console. It is contemplated that a cylindrical cover storage container similar to that provided on the front end of the cover support frame may be provided in the rear, if desired.

The cover member 37 may be formed with an elongated transverse opening 51 therein which is surrounded by a bearing collar 53. This transverse opening bears simultaneously on opposite sides of lever 9 but permits the lateral displacement of the transmission shift lever if required in operation of the vehicle.

When the shift lever is moved to a forward position the lever bears on the collar 53 and pushes the cover forward. The forward end cover will store itself into the front cylindrical container by coiling itself therein. When the shift lever is moved to the rear, the lever bears on the collar 53 and displaces the cover in a rearward direction; the front end of the cover begins to uncoil in the front storage compartment while the rear portion is carried into the rear storage space 49.

Since the cover seal, while allowing shift lever movement, keeps the opening 15 in the console closed, the interior of the console and the universal joint and the boot housed therein are protected from objectionable foreign materials which would otherwise enter through the opening 15.

From the foregoing it will be seen that applicant has provided a console including a cover seal unit for an opening formed in the console that will effectively cover the opening and accommodate all necessary movements of a movable lever mounted therein. Improved storage of the cover seal is provided confining the cover seal substantially to the area of the opening so that the size of the console panel may be reduced or adjacent areas of the panel may be employed to mount other items such as an ash tray or radio.

It is to be understood that the invention can be modified beyond the illustrated embodiments and therefore any limitations to be imposed are those set forth in the following claims.

I claim:

1. In a console having an upper panel formed with a generally rectangular opening therein to accommodate the longitudinal and lateral movements of a transmission shift lever projecting therethrough, a one-piece support frame having elongated sides and front and rear end portions cooperating to form a generally rectangular opening therebetween, fastener means removably mounting said one-piece support frame in the console closely adjacent the opening therein, said elongated sides being formed with opposing inwardly facing track portions, said front end portion being formed by a wall portion curved to define a cylindrical container, said container having an elongated opening therein, an elongated flexible cover seal having free end portions and outwardly extending tongue portions on opposite sides thereof for slidably mounting said seal in said track portions, one end of said cover seal projecting through said opening into said container, said cover seal forming a closure for the opening in said panel and said support frame, said cover seal being formed with a lateral slot therein to permit lateral movement of the shift lever projecting therethrough without movement of said cover seal, an enlarged bearing collar formed on said cover seal bounding said slot, said collar being contacted by the transmission shift lever thereby permitting said shift lever to move said cover seal as a unit, said cover seal being coiled in said container on movement of said cover seal toward said container in response to predetermined movement of said shift lever, guide means on the rear end portion of said frame for directing the opposite end portion of said cover seal downwardly into said console in response to movement of the lever in an opposite direction.

2. In combination, a support, an elongated shift control lever, ball joint means mounting an end portion of said control lever on said support for universal movement, a housing for said control lever having a panel with an enlarged opening therein, said lever projecting from said ball joint means through said opening, a one-piece support bracket removably secured to the interior of said housing, said support bracket being formed of sheet material having an apertured central base portion to accommodate the universal movements of said lever projecting therethrough, said bracket having opposite side portions bent over to provide inwardly facing guide channels, said bracket including end portions with one end portion formed by having the flat continuation of said base portion bent downwardly into a partial cylindrical container with a terminal edge aligned with said channels, said cylindrical portion being cut out to leave marginal guide portions, an elongated laterally-ridged flexible cover seal mounted in said bracket covering said aperture therein, said cover seal having free end portions and having edge portions slidably mounted in said guide portions, an elongated slot formed in said cover seal for receiving said lever, said cover seal having one end portion received in said container and being self-storing in said container in response to pivotal movement of said lever toward said container, said slot permitting pivotal movement of said lever toward either of said sides and means formed on the opposite end portion of said bracket for directing an opposite end portion of said cover seal into the interior of said housing in response to movement of said lever toward said last mentioned end portion.

3. A panel member formed with an enlarged opening therein, a support bracket having longitudinally extending side portions and end portions, an enlarged opening formed in said bracket and bounded by said side and opposite end portions, means mounting said bracket on said panel, said opening in said bracket and said panel being substantially aligned, said openings being dimensionally sufficient to accommodate said longitudinal and lateral movements of a lever which projects therethrough, said support bracket including spaced longitudinally-extending and inwardly-facing tracks, each one of said tracks being adjacent a corresponding side portion of said bracket, said bracket also having downwardly curved guide portions aligned with said tracks adjacent the end portions thereof, an elongated flexible cover slidably mounted in said tracks and having free end portions, said free end portions extending beyond said curve guide portions, said cover closing said opening in said bracket and in said panel member, an elongated slot in said cover having a major dimension extending toward said tracks, said slot being formed to receive the lever and accommodate the lateral movements thereof, said cover being longitudinally moveable in said tracks in response to longitudinal movements of said lever, said free end portions of said cover being directed by said curved guide portions in a curved path in response to longitudinal movement of said cover and means mounting said bracket and said cover as a unit to said panel member.

4. In combination, a support, a transmission shift control lever, pivot means pivotally mounting said shift control lever to said support for universal movement with respect thereto, a housing for said control lever, said housing including a panel having an enlarged opening therein, said lever projecting from said pivot means and extending through said opening in said panel, a support frame mounted on said panel, said frame having longitudinally extending side portions and first and second end portions which form an opening therebetween, means securing said frame to said housing, said openings in said panel and said frame being substantially aligned, said lever projecting through said opening in said frame, each of said side portions having a longitudinally extending and inwardly facing track, said frame further including downwardly extending curved guide portions near the end portions thereof, one of said guide portions including a partly cylindrical guide member aligned with said tracks, said guide member curving beneath said side portions, an elongated one-piece flexible cover having opposite free end portions, said cover having one free end portion received in one of said curved guide portions and the opposite free end portion received in the other of said curved guide portions, said cover extending completely across the opening formed in said frame and closing the opening in said panel, a lateral slot in said cover, said control lever extending through said slot, said cover being movable in response to longitudinal movements of said lever, said curved guide portions being operative to turn the free end portions in a curved path within said housing.

References Cited by the Examiner

UNITED STATES PATENTS

| | | | |
|---|---|---|---|
| 1,484,824 | 2/1924 | Gaulke | 180—90.6 |
| 1,527,865 | 2/1925 | Guiss | 160—133 |
| 3,077,789 | 2/1963 | Lashmutt | 74—566 |

FOREIGN PATENTS

| | | |
|---|---|---|
| 441,084 | 3/1935 | Great Britain. |
| 493,115 | 10/1938 | Great Britain. |

FRED C. MATTERN, Jr., *Primary Examiner.*

BROUGHTON G. DURHAM, *Examiner.*

W. S. RATLIFF, *Assistant Examiner.*